United States Patent [19]

Curatolo et al.

[11] Patent Number: 5,286,828
[45] Date of Patent: Feb. 15, 1994

[54] PREPARATION OF MELT-PROCESSABLE ACRYLONITRILE/METHACRYLONITRILE COPOLYMERS

[75] Inventors: Benedict S. Curatolo, Valley View; George S. Li, Solon, both of Ohio

[73] Assignee: The Standard Oil Company, Cleveland, Ohio

[21] Appl. No.: 780,167

[22] Filed: Oct. 21, 1991

Related U.S. Application Data

[62] Division of Ser. No. 633,655, Dec. 21, 1990, Pat. No. 5,106,925.

[51] Int. Cl.$^5$ .......................................... C08F 220/48
[52] U.S. Cl. ............................................... 526/342
[58] Field of Search ......................................... 526/342

[56] References Cited

U.S. PATENT DOCUMENTS

| | | | |
|---|---|---|---|
| 2,692,875 | 10/1954 | Weinstock et al. | 526/342 |
| 2,851,447 | 9/1958 | Wesp et al. | 526/342 X |
| 2,984,650 | 5/1961 | Slocombe et al. | 526/342 |
| 3,565,876 | 2/1971 | Ball et al. | 528/481 |

*Primary Examiner*—Joseph L. Schofer
*Assistant Examiner*—Mark Nagumo
*Attorney, Agent, or Firm*—Michael F. Esposito; David J. Untener; Charles S. Lynch

[57] ABSTRACT

A process for forming a stable and processable polymer comprised of methacrylonitrile (10 to 80 percent) and acrylonitrile (20 to 90 percent) by controlling the ratio of the monomers in the reaction mixture.

12 Claims, No Drawings

PREPARATION OF MELT-PROCESSABLE ACRYLONITRILE/METHACRYLONITRILE COPOLYMERS

This is a divisional of co-pending application Ser. No. 7/633,655 filed Dec. 21, 1990, now U.S. Pat. No. 5,106,925.

BACKGROUND OF THE INVENTION

This invention relates to articles composed of resinous polymers of acrylonitrile (AN) and methacrylonitrile (MAN) and particularly to multiaxially oriented articles and more particularly to multiaxially oriented films of copolymers of acrylonitrile and methacrylonitrile.

Polyacrylonitrile (PAN) has excellent barrier properties, chemical resistance, rigidity, and heat resistance. PAN, however, is not a thermoplastic, and must be dissolved in a solvent in order to be processed. The use of a solvent negatively affects the polymer's barrier properties.

Polymethacrylonitrile (PMAN) also has desirable barrier properties, chemical resistance, and rigidity although they are not as good as those of PAN. In contrast to PAN, PMAN is a melt processable thermoplastic, but it is prone to de-polymerization at high temperatures.

In this invention, copolymers of AN and MAN have been formed to obtain the best properties of both PAN and PMAN. A copolymer of these nitriles results in an article having excellent barrier properties, chemical resistance, rigidity and heat resistance. while desirable thermoplastic properties such as melt stability for melt processing are also obtained.

Prior to this invention, copolymers of AN and MAN were formed using only small amounts of AN, because polymers made with more than 20% by weight of polymerized acrylonitrile could not be extruded. For example, it is taught in U.S. Pat. No. 3,565,876 that up to about 20% by weight of acrylonitrile can be copolymerized with methacrylonitrile to form extrudible copolymers which can be readily oriented and possess excellent physical properties. Increasing the acrylonitrile content above 20% by weight in acrylonitrile/methacrylonitrile copolymers resulted in a resin which was unstable and not processable by any of the usual commercial techniques known today, including extrusion. Although the copolymers of the U.S. Pat. No. 3,565,876 had desirable qualities, their low AN content failed to take full advantage of AN's superior barrier characteristics.

In this art, therefore, it is desirable to have a processable, stable acrylonitrile/methacrylonitrile copolymer system wherein the acrylonitrile content is greater than 20% of the final polymer composition.

SUMMARY OF THE INVENTION

Accordingly, it is a primary object of this invention to provide an improved process for making an acrylonitrile/methacrylonitrile copolymer.

It is a further object of this invention to provide new and improved AN/MAN copolymers containing greater than 20% AN. It is a further object of this invention to provide a new and improved process for forming AN/MAN copolymers having greater than 20% AN which are melt processable and stable.

Additional objects and advantages of the invention will be set forth in part in the description which follows and in part will be obvious from the description or may be learned by practice of the invention. The objects and advantages of the invention may be realized and obtained by means of the instrumentalities and combinations particularly pointed out in the appended claims.

To achieve the foregoing objects and in accordance with the purpose of the invention, as embodied and broadly described herein, the process of this invention comprises forming a viscous polymer by the polymerization, of a mixture of methacrylonitrile and acrylonitrile, wherein the addition of the monomers throughout the reaction is such that the ratio of acrylonitrile to methacrylonitrile remains relatively constant throughout the reaction. This results in a relatively homogeneous final polymer composition wherein there are no long sequences of AN units or long sequences of MAN units, but a somewhat random ordering of these units in the polymer chain. Relatively constant means a ratio of monomers which achieves this somewhat random ordering.

By practicing this process, processable and stable polymers of 10 to 80 percent by weight methacrylonitrile and 20 to 90 percent by weight acrylonitrile can be formed. Preferably, the polymer is 25 to 50 percent by weight MAN and 75 to 50 percent by weight AN.

DETAILED DESCRIPTION OF THE INVENTION

While the invention will be described in connection with a preferred procedure, it will be understood that it is not intended to limit the invention to that procedure. On the contrary, it is intended to cover all alternatives, modifications and equivalents as may be included within the spirit and scope of the invention defined by the appended claims.

In accordance with the invention, a representative polymerization procedure, comprises contacting about 0.1% to 10% by weight of a suitable emulsifier or dispersing agent in an aqueous medium, about 0.01% to 5% by weight of a molecular weight modifier, about 0.01% to 5% by weight of an initiator, and monomers. The methacrylonitrile is 5 to 80 percent by weight of the monomers and the acrylonitrile is 95 to 20 percent by weight of the monomers. The mixture is placed in a purged reaction vessel which has a means of agitation, such as stirring or shaking. Preferably, the reaction vessel and reactants are initially purged with an inert gas, more preferably the gas used is nitrogen or argon. The mixture is heated to a temperature in the range of 40° C. to 80° C., preferably about 60° C. The mixture is continuously or intermittently agitated. Preferably, the mixture is continuously agitated. Preferably, a stirrer speed of about 200 rpm is used. The agitation is continued until polymerization has proceeded to the desired extent, usually 40%-100% conversion. Preferably, the polymerization continues to at least 60% to 80% of completion.

In the foregoing polymerization reaction, the molar ratios of AN and MAN reactants must be carefully controlled throughout the reaction, because the monomers react at different rates. MAN reacts faster with propagating free radicals in this system than does AN which leads to excess MAN in the polymer and excess AN in the unreacted monomer mixture. If too great an excess of AN becomes present in the monomer mixture, long strings of acrylonitrile units may form. Long AN strings lead to unprocessable products. For this reason, in the practice of the present invention, the polymerization reaction requires either incremental or continuous addition of the reactants.

In one embodiment, the monomer reactants are added in various increments, 10% of the total monomer reactants as starting materials to initiate the reaction, and three remaining 30% portions at later periods in the reaction. Each of the additions comprises AN/MAN in amounts controlled in order to obtain the desired AN/MAN ratio in the final product. This procedure continues until all of the monomer reactants have been added. Once the final reactant addition is made, polymerization is typically complete to at least 40% to 75%. Of course, other reactant addition increments may be used.

In another embodiment, it is possible to add most of the reactants at the initiation of the reaction. As the reaction proceeds, more of the highly reactive MAN monomer is added. This technique functions to steady the resultant polymer homogeneity by maintaining the same monomer ratio throughout the reaction through matching MAN addition to the conversion rate to polymer in the proper proportion.

In the most preferred embodiment, both reactants are added based on tracking of the polymer conversion in the same amounts as they are removed from the monomer mixture by polymerization.

As can be seen from the above embodiments, the primary objective of any procedure is to maintain the desired final AN/MAN ratio throughout the entire reaction. If the ratios become too unbalanced, MAN may polymerize into long strings and become used up from the monomer mixture, and the remaining AN may polymerize into long unprocessable strings. The identified procedures function to produce melt-processable AN/MAN copolymers with excellent physical properties, by preventing the formation of long AN strings.

The free radical initiator of the present invention may be selected from the group comprising Azo compounds, peroxides, hydroperoxides, alkyl peroxides, peroxydicarbonates, peroxyesters, dialkyl peroxides, persulfates, perphosphates or another initiator known to those skilled in the art. Of course, the reaction could also be intiated by thermal means rather than the above described chemical means.

The molecular weight modifier of the present invention can be mercaptans, alcohols or any other chain transfer agent known to those of ordinary skill in the art. Mercaptans are the preferred molecular weight modifier.

At the conclusion of the reaction, the polymer of this invention may be isolated as a finely divided powder by crumb coagulation.

The crumb coagulation procedure consists of adding the product emulsion to an appropriate electrolyte solution with rapid agitation at a temperature just below the point at which the precipitated particles tend to adhere. This procedure yields a polymer in a form of granules or particles which are filtered and washed. Suitable electrolytes include sodium chloride, sodium sulfate, hydrochloric acid, phosphoric acid, calcium chloride, magnesium sulfate and aluminum sulfate which is preferred. After precipitation, the polymer is filtered and washed repeatedly with water to minimize traces of electrolyte and dispersing agent which may adhere to the particles. Washing with dilute solutions of caustic soda or ammonium hydroxide may assist in removing the last traces of dispersing agent, and at the same time yield polymers of improved heat stability. It is also beneficial to employ a final wash of an organic solvent such as a lower aliphatic alcohol (methanol or ethanol) to remove any residual soap or impurities.

Other means for isolating the polymer include spraying the solution into a heated and/or evacuated chamber where the water vapors are removed and the polymer falls to the bottom of the chamber. If the polymer is prepared with sufficiently high solids content it can be isolated as a granular powder by filtration or centrifugation. The polymer may also be isolated by cooling the dispersion below the freezing point of the aqueous medium or by the addition of a large volume of a lower aliphatic alcohol such as methanol or ethanol.

If desirable, lubricants, dyes, bleaching agents, plasticizers or pseudoplasticizers, pigments, stabilizers, antioxidants, reinforcing agents (including fillers and fibers) and antistatic agents may be incorporated into a polymer of this invention.

The polymers of this invention can be formed into films having extremely good barrier properties. Particularly, the oxygen transmission rate of films of this invention are generally below 0.30 (cc mil/100 in$^2$ atm-24 hr.). Preferably, the oxygen transmission rate is below 0.10 (cc mil/100 in$^2$ atm-24 hr.). Most preferably the oxygen transmission rate is below 0.05 (cc mil/100 in$^2$ atm-24 hr.). The water vapor transmission rate is generally below 3.25 (g-mil/100 in$^2$-24 hr.). Preferably, the water vapor transmission rate is below 2.00 (g-mil/100 in$^2$-24 hr.). Most preferably, the water vapor transmission rate is below 1.00 (g-mil/100 in$^2$-24 hr.).

The films of this invention may be prepared by solvent casting or preferably by a thermal forming procedure such an extrusion, injection molding, compression molding or calendering, however, for economic reasons and for ease in processing it is most preferred that the polymer be extruded. The polymers of this invention may be extruded from any conventional type extruder at a temperature of about 160° C. to 250° C. Preferably, the extrusion is at about 200° C. to 220° C. A screwtype extruder employing an annular die to form a thin walled polymer cylinder or sheet die to form a continuous sheet may be used.

The polymers of this invention are also suitable for forming fibers. This can be accomplished by solution spinning or melt spinning by procedures known to those skilled in the art.

Because the copolymer AN/MAN is thermoplastic, it can be oriented as a solvent-free material. This is an advantage because the presence of any solvent in the polymer makes orientation difficult and adversely affects the barrier properties of the polymer.

EXAMPLES

Copolymers of methacrylonitrile/acrylonitrile were prepared by means of emulsion polymerization according to the following general procedure.

A two liter reactor containing 900 g of deionized water was used. 9 g of GAFAC RE-610[1] was dissolved in the water overnight. Acrylonitrile and methacrylonitrile totalling 300 g (the specific ratio dependent on the final product desired) were added. An initiator generically 2,2'-azobis (2,4-dimethylvaleronitrile), specifically Vazo ® 52 polymerization initiator made by DuPont Company) and N-dodecyl mercaptan were added to the reactants. The reactants and reactor were nitrogen purged. The reaction temperature was 60° C. with a stirrer speed of 200 rpm. At the end of the reaction time, (40-80% conversion of monomers to polymers) the products were isolated by crumb-coagulation in an aluminum sulfate solution at 77° C., water washed, methanol soaked, filtered, and fluid bed dried. The oxygen transmission rate and water vapor transmission rate results of films having different AN:MAN ratios can be seen in Table 1.

[1] A mixture of $R-O-(CH_2CH_2O-)_nPO_3M_2$ and $[R-O-(CH_2CH_2O-)_n]_2PO_2M$ wherein n is a number of from 1 to 40, R is an alkyl-aryl or alkyl group and preferably a nonyl phenyl group and M is hydrogen, ammonia or an alkali metal, which composition is sold by the General Aniline and Film Corporation.

EXAMPLE 1

211.0 grams of acrylonitrile and 89.0 grams of methacrylonitrile were added as follows: 10% of the monomers were charged to the reactor before addition of the initiator; 30% of the monomers were added in each of three 90 minute periods; 6 g of N-dodecyl mercaptan were added in three 2 g installments, just prior to each of the three 90 minute monomer addition periods. 1.5 g of Vazo ® 52 polymerization initiator were added to the reactor when the reaction mass reached 60° C. The monomers resulted in a polymer composition of 72.4 mole percent acrylonitrile and 27.6 mole percent methacrylonitrile.

EXAMPLE 2

231.4 grams of AN and 68.6 grams of MAN were added at the beginning of the reaction. Additional MAN (13.6 grams) was added in each of three 90 minute stages of the reaction to compensate for its higher conversion rate and maintain the initial monomer feed ratio in the reactor. 6 g of N-dodecyl mercaptan were added in three 2 g installments, just prior to each of the three 90 minute monomer addition periods. 1.5 g of Vazo ® 52 polymerization initiator were added to the reactor when the reaction mass reached 60° C. The reaction resulted in a polymer composition of 65.1 mole percent AN and 34.9 mole percent MAN.

EXAMPLE 3

183.9 grams of AN and 116.1 grams of MAN were charged to the reactor at the beginning of the reaction. Additional MAN (16.4 grams) was added in each of three 90 minute stages of the reaction to compensate for its higher conversion rate and maintain the initial monomer feed ratio in the reactor. 6 g of N-dodecyl mercaptan were added in three 2 g installments, just prior to each of the three 90 minute monomer addition periods. 1.5 g of Vazo ® 52 polymerization initiator were added to the reactor when the reaction mass reached 60° C. The reaction resulted in a polymer composition of 50.7 mole percent AN and 49.3 mole percent MAN.

EXAMPLE 4

126.6 grams of AN and 173.4 grams of MAN were added as follows: 10% of the monomers were charged to the reactor before addition of the initiator; 30% of the monomers were added in each of three 90 minute periods; 6 g of N-dodecyl mercaptan were added in three 2 g installments, just prior to each of the three 90 minute monomer addition periods. 1.5 g of Vazo ® 52 polymerization initiator were added to the reactor when the reaction mass reached 60° C. The polymer composition consisted of 38.7 mole percent AN and 61.3 mole percent MAN.

PMAN 300 grams of MAN were added as follows: 10% of the monomer was charged to the reactor before addition of the initiator; 30% of the monomer was added in each of three 90 minute periods; 6 g of N-dodecyl mercaptan were added in three 2 g installments, just prior to each of the three 90 minute monomer addition periods. 1.5 g of Vazo ® 52 polymerization initiator were added to the reactor when the reaction mass reached 60° C. The polymer was 100% MAN.

TABLE 1

| Example | AN/MAN Ratio (Mole %) | Oxygen Transmission Rate (cc mil/100 in$^2$ atm-24 hr) | Water Vapor Transmission Rate (g-mil/100 in$^2$-24 hr) |
|---------|-----------------------|--------------------------------------------------------|--------------------------------------------------------|
| 1       | 72.4/27.6             | 0.03                                                   | 0.62                                                   |
| 2       | 65.1/34.9             | 0.03                                                   | 1.74                                                   |
| 3       | 50.7/49.3             | 0.05                                                   | 2.27                                                   |
| 4       | 38.7/61.3             | 0.28                                                   | 3.18                                                   |
| PMAN    | 0/100                 | 0.33                                                   | 2.52                                                   |

Each of the examples showed a good melt processability. Particularly, Brabendering at 235° C. showed torques of 400 to 2000 meter-grams.

Thus is apparent that there has been provided, in accordance with the invention, new and improved copolymer compositions that fully satisfy the objects, aims and advantages set forth above. While the invention has been described in conjunction with specific embodiments thereof, it is evident that many alternatives, modifications, and variations will be apparent to those skilled in the art in light of the foregoing description. Accordingly, the invention is intended to embrace all such alternatives, modifications, and variations as fall within the spirit and broad scope of the appended claims.

We claim:

1. A melt-processable polymer containing 50 to 90 weight percent polymerized acrylonitrile and at least 10 weight percent polymerized methacrylonitrile which is extrudable and stable as a melt.

2. A melt-processable polymer of claim 1 containing at least 25 weight percent polymerized methacrylonitrile.

3. The polymer of claim 1, wherein said methacrylonitrile which is comprises 25 to 50 percent by weight and said acrylonitrile comprises 75 to 50 percent by weight.

4. The polymer of claim 1 having an oxygen transmission rate less than 0.30 cc mil/100 in$^2$ atm-24 hr.

5. The polymer of claim 4 having an oxygen transmission rate less than 0.10 cc mil/100 in$^2$ atm-24 hr.

6. The polymer of claim 1, having a water vapor transmission rate less than 2.00 (g-mil/100 in$^2$-24 hr.).

7. The polymer of claim 1 having a water vapor transmission rate less than 1.00 (g-mil/100 in$^2$-24 hr.).

8. The polymer of claim 1, wherein said methacrylonitrile and said acrylonitrile are randomly ordered throughout said polymer chain.

9. A fiber formed by spinning from a melt-processable polymer containing 50 to 90 weight percent polymerized acrylonitrile and at least 10 weight percent polymerized methacrylonitrile which is extrudable and stable as a melt.

10. A fiber of claim 9 wherein said spinning is melt spinning.

11. A fiber formed by spinning from a melt-processable polymer containing 50 to 90 weight percent polymerized acrylonitrile and at least 25 weight percent polymerized methacrylonitrile which is extrudable and stable as a melt.

12. A fiber of claim 11 wherein said spinning is melt spinning.

* * * * *